US012670863B2

(12) United States Patent
Kim

(10) Patent No.: US 12,670,863 B2
(45) Date of Patent: Jun. 30, 2026

(54) DISPLAY APPARATUS

(71) Applicant: Samsung Display Co., Ltd., Yongin-si (KR)

(72) Inventor: Yeongho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/174,528

(22) Filed: Feb. 24, 2023

(65) Prior Publication Data

US 2023/0368740 A1 Nov. 16, 2023

(30) Foreign Application Priority Data

May 13, 2022 (KR) ........................ 10-2022-0059106

(51) Int. Cl.
*G09G 3/3266* (2016.01)
*G09G 3/3291* (2016.01)

(52) U.S. Cl.
CPC ......... *G09G 3/3266* (2013.01); *G09G 3/3291* (2013.01); *G09G 2310/0278* (2013.01); *G09G 2380/02* (2013.01)

(58) Field of Classification Search
CPC ............... G09G 3/3266; G09G 3/3291; G09G 2310/0278; G09G 2380/02
See application file for complete search history.

(56) References Cited

U.S. PATENT DOCUMENTS 7,727,836 B2 6/2010 Yamazaki et al.
8,502,231 B2 8/2013 Arao
2005/0104832 A1* 5/2005 Lee ..................... G02F 1/13452 345/92
2006/0139291 A1* 6/2006 Cho ..................... G09G 3/3688 345/100
2020/0226978 A1 7/2020 Lin et al.
2020/0321427 A1* 10/2020 Park ................... H10K 59/1315
2021/0193782 A1* 6/2021 Seo ...................... H10K 59/131
2021/0391406 A1 12/2021 Choi et al.
2022/0036832 A1* 2/2022 Lim ..................... G09G 3/3291

(Continued)

FOREIGN PATENT DOCUMENTS

JP 2011-242786 A 12/2011
KR 10-2000-0057776 A 9/2000
KR 1020050001882 A * 1/2005

(Continued)

*Primary Examiner* — Stacy Khoo

(74) *Attorney, Agent, or Firm* — Womble Bond Dickinson (US) LLP

(57) ABSTRACT

A display apparatus includes: a substrate comprising a display area and a peripheral area; a light-emitting diode in the display area on a front surface of the substrate; a driving transistor in the display area, electrically connected to the light-emitting diode, and comprising a silicon-based semiconductor layer; a switching transistor in the display area and configured to transmit a data voltage to the driving transistor; a compensation transistor in the display area, configured to diode-connect the driving transistor, and comprising an oxide-based semiconductor layer; a gate driving circuit in the peripheral area and electrically connected to the compensation transistor; and a first lower layer in the peripheral area and interposed between the substrate and the gate driving circuit.

19 Claims, 14 Drawing Sheets

(56) References Cited

U.S. PATENT DOCUMENTS

2022/0209145 A1* 6/2022 Kim ........................ B32B 15/06

FOREIGN PATENT DOCUMENTS

| | | | | |
|---|---|---|---|---|
| KR | 10-0543008 | B1 | | 1/2006 |
| KR | 10-2020-0087711 | A | | 7/2020 |
| KR | 10-2020-0118315 | A | | 10/2020 |
| KR | 10-2021-0153808 | A | | 12/2021 |
| WO | WO-2022259357 | A1 | * | 12/2022 |

* cited by examiner

DISPLAY APPARATUS

CROSS-REFERENCE TO RELATED APPLICATION

The present application claims priority to and the benefit of Korean Patent Application No. 10-2022-0059106 filed on May 13, 2022, in the Korean Intellectual Property Office, the entire disclosure of which is incorporated herein by reference.

BACKGROUND

1. Field

Aspects of one or more embodiments relate to a display apparatus.

2. Description of the Related Art

Display apparatuses visually or graphically display data or images. Recently, display apparatuses have been more widely used for a wide variety of purposes and applications. As thicknesses and weights of display apparatuses have decreased as technology has progressed, the range of potential applications of display apparatuses has increased. As display apparatuses have been used in various ways, various methods have been studied to design display panels.

The above information disclosed in this Background section is only for enhancement of understanding of the background and therefore the information discussed in this Background section does not necessarily constitute prior art.

SUMMARY

Aspects of one or more embodiments include a structure related to a display apparatus.

Additional aspects will be set forth in part in the description which follows and, in part, will be more apparent from the description, or may be learned by practice of the presented embodiments.

According to one or more embodiments, a display apparatus includes a substrate including a display area and a peripheral area, a light-emitting diode located in the display area and located on a front surface of the substrate, a driving transistor located in the display area, electrically connected to the light-emitting diode, and including a silicon-based semiconductor layer, a switching transistor located in the display area and configured to transmit a data voltage to the driving transistor, a compensation transistor located in the display area, configured to diode-connect the driving transistor, and including an oxide-based semiconductor layer, a gate driving circuit located in the peripheral area and electrically connected to the compensation transistor, and a first lower layer located in the peripheral area and interposed between the substrate and the gate driving circuit.

According to some embodiments, the first lower layer may include a metal.

According to some embodiments, the display apparatus may further include a bottom metal layer located in the display area and including a portion overlapping the driving transistor, wherein the first lower layer and the bottom metal layer include a same material.

According to some embodiments, a portion of the first lower layer adjacent to an edge of the substrate may further extend from the gate driving circuit toward the edge of the substrate.

According to some embodiments, the display apparatus may further include a first metal layer located on a rear surface of the substrate opposite to the front surface of the substrate, and having a mesh structure including a plurality of holes.

According to some embodiments, at least one of the plurality of holes of the first metal layer may overlap the gate driving circuit.

According to some embodiments, the substrate may include a folding area, wherein the plurality of holes of the first metal layer correspond to the folding area of the substrate.

According to some embodiments, the display apparatus may further include a protective layer located on the light-emitting diode and including a light-shielding portion corresponding to the peripheral area, wherein the gate driving circuit overlaps the light-shielding portion of the protective layer.

According to some embodiments, the first lower layer may have a constant voltage level.

According to some embodiments, a center of a width of the first lower layer may be spaced apart from a center of a width of the gate driving circuit toward an edge of the substrate.

According to one or more embodiments, a display apparatus includes a substrate including a display area and a peripheral area, a plurality of light-emitting diodes located on a front surface of the substrate and arranged in the display area, a plurality of sub-pixel circuits respectively electrically connected to the plurality of light-emitting diodes and arranged in the display area, wherein each of the plurality of sub-pixel circuits includes a driving transistor located in the display area and electrically connected to the light-emitting diode, a switching transistor located in the display area and configured to transmit a data voltage to the driving transistor, and a compensation transistor located in the display area and configured to diode-connect the driving transistor, a first gate driver circuit located in the peripheral area and configured to apply a compensation signal to compensation transistors of sub-pixel circuits arranged in an $n^{th}$ row (n is a natural number) through a compensation gate line, and a first lower layer located in the peripheral area and interposed between the substrate and the first gate driver circuit.

According to some embodiments, each of the plurality of sub-pixel circuits may further include an initialization transistor electrically connected to a gate electrode of the driving transistor, wherein the first gate driver circuit is configured to apply a gate initialization signal to initialization transistors of sub-pixel circuits arranged in an $m^{th}$ row (m is a natural number greater than n+1) through an initialization gate line.

According to some embodiments, the first lower layer may include a metal.

According to some embodiments, the display apparatus may further include a bottom metal layer located in the display area and including a portion overlapping the driving transistor, wherein the first lower layer and the bottom metal layer include a same material.

According to some embodiments, a portion of the first lower layer adjacent to an edge of the substrate may further extend from the first gate driver circuit toward the edge of the substrate.

According to some embodiments, the display apparatus may further include a first metal layer located on a rear surface of the substrate opposite to the front surface of the substrate, and having a mesh structure including a plurality of holes.

According to some embodiments, at least one of the plurality of holes of the first metal layer may overlap the first gate driver circuit.

According to some embodiments, the substrate may include a folding area, wherein the plurality of holes of the first metal layer correspond to the folding area of the substrate.

According to some embodiments, the display apparatus may further include a protective layer located on the plurality of light-emitting diodes and including a light-shielding portion corresponding to the peripheral area, wherein the first gate driver circuit overlaps the light-shielding portion of the protective layer.

According to some embodiments, the first lower layer may have a constant voltage level, wherein a center of a width of the first lower layer is spaced apart from a center of a width of the first gate driver circuit toward an edge of the substrate.

BRIEF DESCRIPTION OF THE DRAWINGS

The above and other aspects, features, and characteristics of certain embodiments will be more apparent from the following description taken in conjunction with the accompanying drawings, in which.

DETAILED DESCRIPTION

Figure 1A:
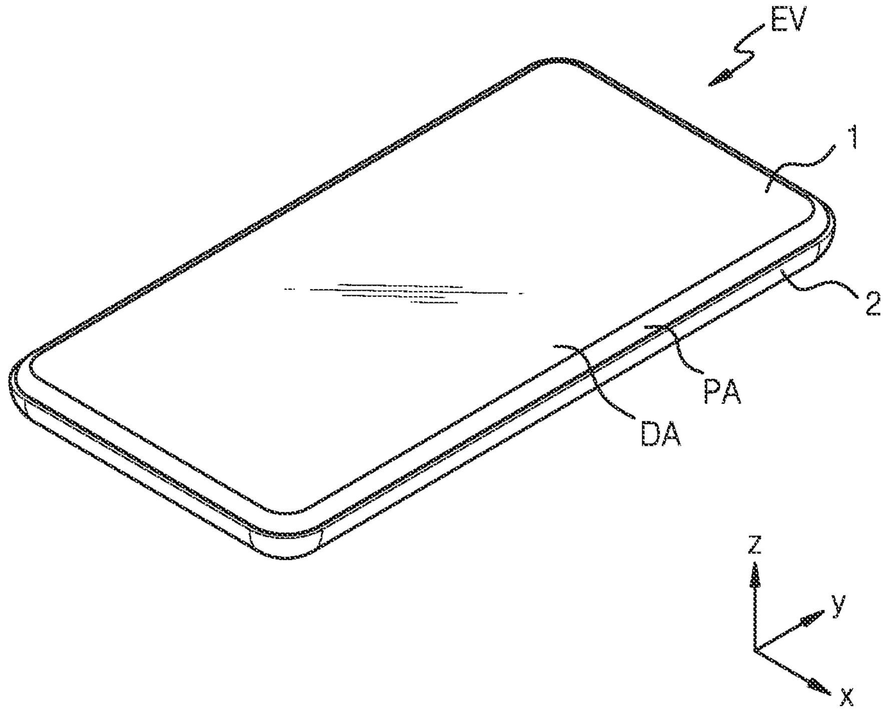
FIGS. 1A and 1B are perspective views schematically illustrating an electronic device, according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described in detail with reference to the accompanying drawings, wherein the same or corresponding elements are denoted by the same reference numerals throughout and a repeated description thereof is omitted.

Although the terms "first," "second," etc. may be used to describe various elements, these elements should not be limited by these terms. These terms are only used to distinguish one element from another.

As used herein, the singular forms "a," "an," and "the" are intended to include the plural forms as well, unless the context clearly indicates otherwise.

It will be understood that the terms "including," "having," and "comprising" are intended to indicate the existence of the features or elements described in the specification, and are not intended to preclude the possibility that one or more other features or elements may exist or may be added.

It will be further understood that, when a layer, region, or component is referred to as being "on" another layer, region, or component, it may be directly on the other layer, region, or component, or may be indirectly on the other layer, region, or component with intervening layers, regions, or components therebetween.

Sizes of components in the drawings may be exaggerated or contracted for convenience of explanation. For example, because sizes and thicknesses of elements in the drawings are arbitrarily illustrated for convenience of explanation, the disclosure is not limited thereto.

When a certain embodiment may be implemented differently, a specific process order may be different from the described order. For example, two consecutively described processes may be performed substantially at the same time or may be performed in an order opposite to the described order.

"A and/or B" is used herein to select only A, select only B, or select both A and B. "At least one of A or B" is used to select only A, select only B, or select both A and B.

It will be understood that when a layer, an area, or an element is referred to as being "connected" to another layer, area, or element, it may be "directly connected" to the other layer, area, or element and/or may be "indirectly connected" to the other layer, area, or element with other layers, areas, or elements interposed therebetween. For example, when a layer, an area, or an element is referred to as being "electrically connected," it may be directly electrically connected, and/or may be indirectly electrically connected with intervening layers, areas, or elements therebetween.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 1B:
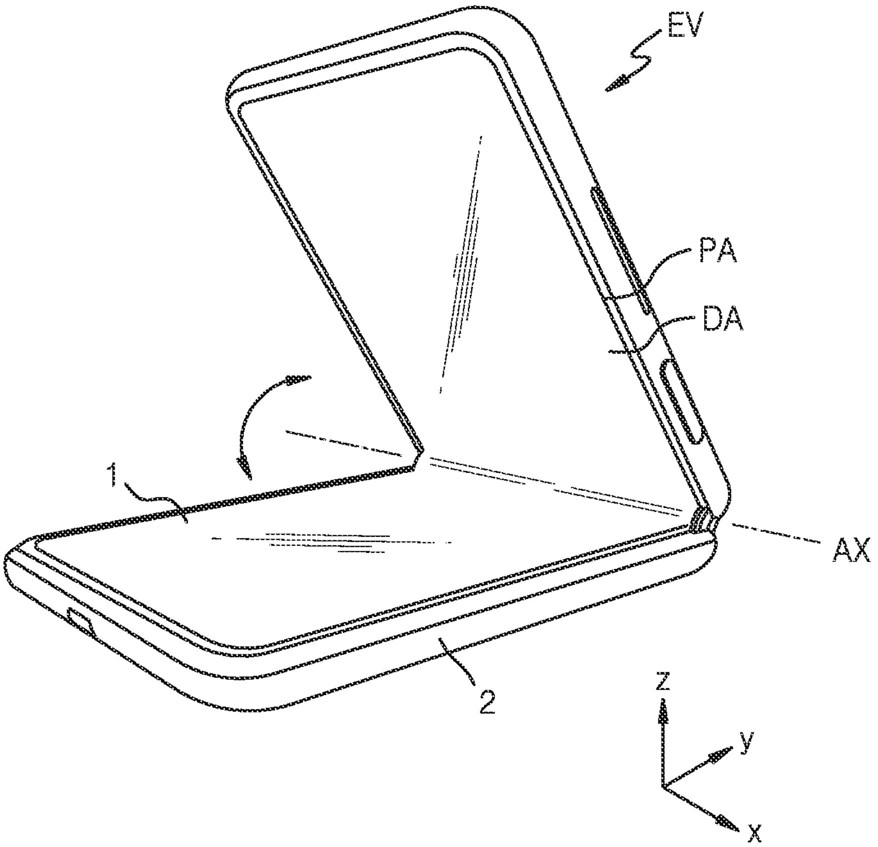

FIGS. 1A and 1B are perspective views schematically illustrating an electronic device, according to some embodiments.

Referring to FIGS. 1A and 1B, an electronic device EV may include a display apparatus 1 and a housing 2. The display apparatus 1 may be assembled with the housing 2, and a central processor for driving the electronic device EV, a battery, etc. may be located in the housing 2.

The electronic device EV may be a device for displaying a moving image (e.g., video) or a still image (e.g., a static image), and may be a portable electronic device such as a mobile phone, a smartphone, a tablet personal computer (PC), a mobile communication terminal, an electronic organizer, an electronic book, a portable multimedia player (PMP), a navigation device, or a ultra-mobile PC (UMPC). Alternatively, the electronic device EV may be used as a display screen of any of various products such as a television, a notebook computer, a monitor, an advertisement board, or an Internet of Things (IOT) device. Also, the electronic device EV according to some embodiments may be applied to a wearable device such as a smart watch, a watch phone, a glasses-type display, or a head-mounted display (HMD). Also, the electronic device EV according to some embodiments may be used as a center information display (CID) located on an instrument panel, a center fascia, or a dashboard of a vehicle, a room mirror display replacing a side-view mirror of a vehicle, or a display located on the back of a front seat for entertainment for a back seat of a vehicle. For convenience of explanation, the electronic device EV according to some embodiments is a smartphone in FIGS. 1A and 1B.

The display apparatus 1 may include a display area DA where an image is provided by using light emitted by sub-pixels and a peripheral area PA outside the display area DA. The peripheral area PA may entirely surround the display area DA. The display apparatus 1 may be of a portable bar type as shown in FIG. 1A, or may be of a portable foldable type as shown in FIG. 1B. For example, the electronic device EV and the display apparatus 1 may be folded around a folding axis AX crossing the display area DA as shown in FIG. 1B.

Figure 2:
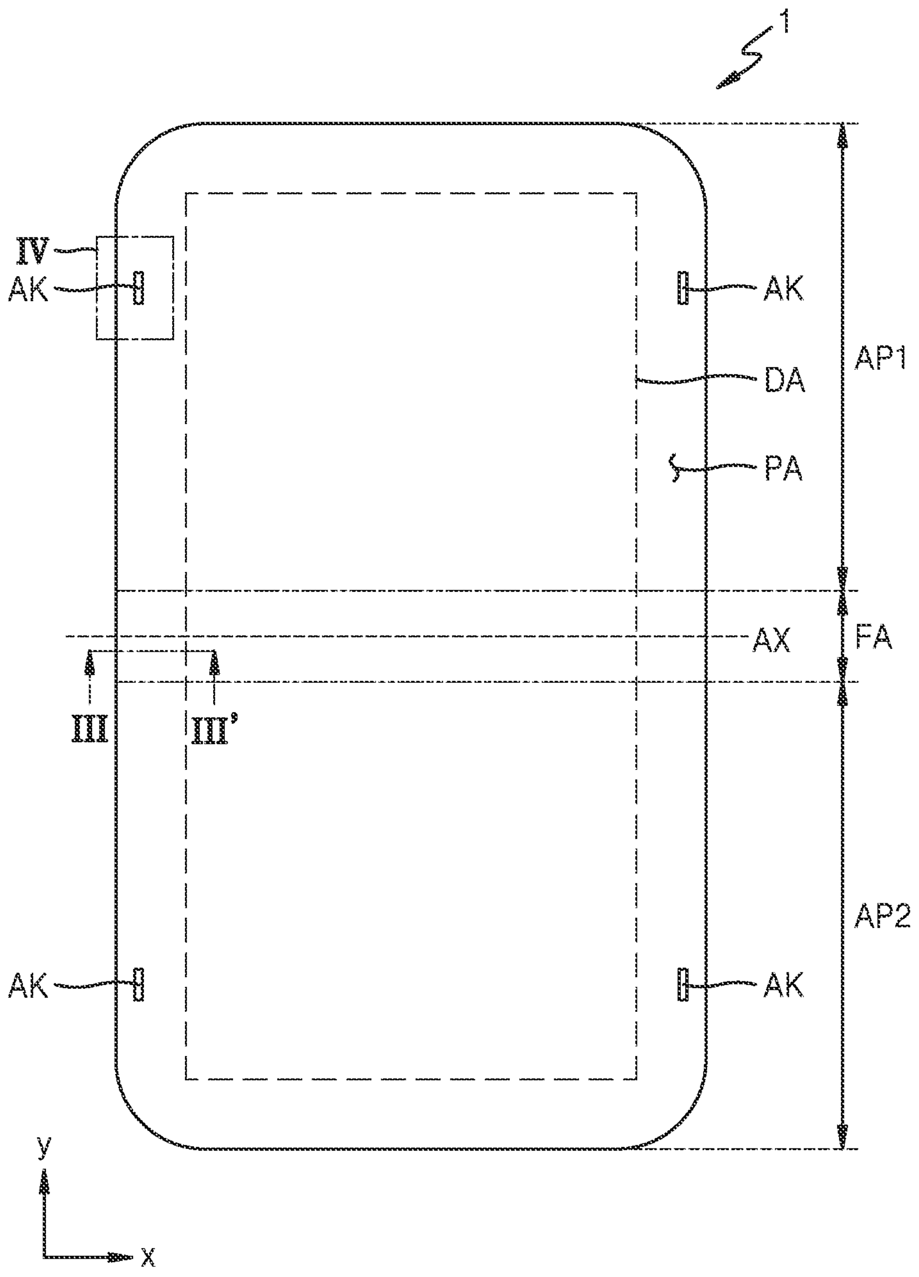
FIG. 2 is a plan view schematically illustrating a display apparatus, according to some embodiments.
Figure 3:
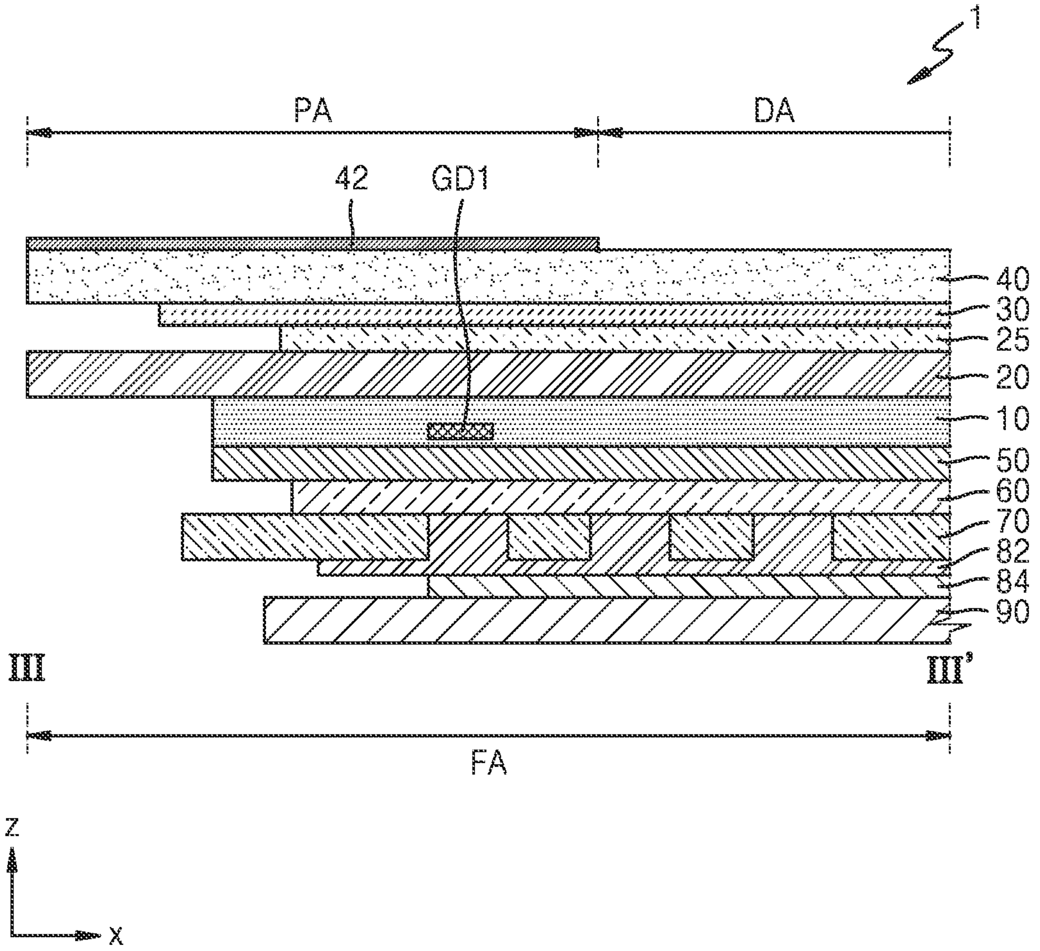
FIG. 3 is a cross-sectional view taken along the line III-III' of FIG. 2.

FIG. 2 is a plan view schematically illustrating a display apparatus, according to some embodiments. FIG. 3 is a cross-sectional view taken along the line III-III' of FIG. 2.

Referring to FIG. 2, the display apparatus 1 may include the display area DA and the peripheral area PA entirely surrounding the display area DA. The display apparatus 1 may be folded around the folding axis AX. In this case, the display apparatus 1 may include a folding area FA through which the folding axis AX passes, and a first area AP1 and a second area AP2 located on both sides of the folding area FA with the folding area FA therebetween. Each of the folding area FA, the first area AP1, and the second area AP2 may include a part of the display area DA and a part of the peripheral area PA. In a folded state, the first area AP1 and the second area AP2 may face each other.

Alignment keys AK used in a manufacturing process of the display apparatus 1 may be located in the peripheral area PA. The alignment keys AK may be located on both sides (e.g., opposite sides) of the display area DA (e.g., left and right sides of the display area DA). In this regard, in FIG. 2, the alignment keys AK may be located over and under the folding axis AX crossing the display area DA. Although the display area DA is folded around the folding axis AX in FIG. 2, according to some embodiments, the display area DA may not be folded as described with reference to FIG. 1A. That is, according to some embodiments, the display area DA may not be foldable, or the folding axis may have a different configuration (e.g., parallel to a different direction relative to the display surface).

Referring to FIG. 3, the display apparatus 1 may include a display panel 10. The display panel 10 may include light-emitting diodes that emit light and are located in the display area DA. To display images through the light-emitting diodes, various elements electrically connected to the light-emitting diodes may be located on the display panel 10. In this regard, FIG. 3 illustrates a first gate driver circuit GD1 located in the peripheral area PA. An anti-reflection layer 20, a cover window 30, and a protective layer 40 may be located on a front surface (or top surface) of the display panel 10.

The anti-reflection layer 20 may reduce a reflectance of light (external light) incident on the display panel 10 through the cover window 30. The anti-reflection layer 20 may include a phase retarder and/or a polarizer. According to some embodiments, the anti-reflection layer 20 may include a black matrix and color filters.

The cover window 30 may be located on the anti-reflection layer 20 with a first adhesive layer 25 such as an optically clear adhesive. The cover window 30 may include a glass material or a plastic material. According to some embodiments, the cover window 30 may include ultra-thin glass.

The protective layer 40 may be located on a top surface of the cover window 30. The protective layer 40 may include a resin material, and may include a light-shielding portion 42 corresponding to the peripheral area PA of the display apparatus 1 (see FIG. 2). The light-shielding portion 42 may be formed on a body portion of the protective layer 40 including the resin material by using deposition, printing, or coating. The light-shielding portion 42 may include a light-shielding material, for example, a dye or a pigment and/or an inorganic material.

The display apparatus 1 may include a protective layer 50, a barrier layer 60, a first metal layer 70, a resin layer 82, a second adhesive layer 84, and a second metal layer 80 located on a rear surface (or bottom surface) of the display panel 10.

The protective layer 50 may include an organic insulating material such as polyethylene terephthalate (PET). The protective layer 50 may entirely cover the rear surface of the display panel 10. The barrier layer 60 may include an organic insulating material different from that of the protective layer 50. For example, the protective layer 50 may include an organic insulating material such as polyimide.

The first metal layer 70 may be located on a rear surface (or a bottom surface) of the barrier layer 60. A portion of the first metal layer 70, for example, a portion corresponding to the folding area FA, may have a lattice pattern (or a mesh pattern). In other words, a portion of the first metal layer 70 corresponding to the folding area FA may have a plurality of holes 72 to include a metal portion having a lattice pattern. When at least a part of the first metal layer 70 has a lattice pattern (or a mesh pattern) as described above, stress applied to the display apparatus 1 when the display apparatus 1 is folded may be reduced.

The holes 72 of the first metal layer 70 may be two-dimensionally arranged, and thus, a portion of the first metal layer 70 may have a lattice pattern (or a mesh pattern). The first metal layer 70 may support and protect the display panel 10, and may help to maintain a shape of the display apparatus 1. The first metal layer 70 may include a metallic material such as stainless steel.

The resin layer 82 may at least partially fill the holes 72 of the first metal layer 70. The resin layer 82 may include a material having excellent durability and flexibility. The resin layer 82 may include, for example, a material such as thermoplastic polyurethane (TPU). Although the resin layer 82 entirely covers a rear surface of the first metal layer 70 while at least partially filling the holes 72 of the first metal layer 70 in FIG. 4, the disclosure is not limited thereto. According to some embodiments, the resin layer 82 may partially fill the holes 72 of the first metal layer 70, but may not cover the rear surface of the first metal layer 70.

A second adhesive layer 84 may be located on the rear surface of the first metal layer 70. For example, the second adhesive layer 84 may be located between the resin layer 82 and the second metal layer 90. As described above, the resin layer 82 may partially fill the holes 72 of the first metal layer 70 but may not cover the rear surface of the first metal layer 70, and in this case, the second adhesive layer 84 may directly contact the rear surface of the first metal layer 70.

The second metal layer 90 may be located on a rear surface of the second adhesive layer 84. The second metal layer 90 may prevent or reduce a step difference of a lower portion of the display apparatus 1, and may prevent or reduce sagging of the display apparatus 1. The second metal layer 90 and the first metal layer 70 may have the same material or different materials. According to some embodiments, the second metal layer 90 may include two portions that are spaced apart from each other with the folding axis AX therebetween. In other words, a first portion of the second metal layer 90 may be located in an area (e.g., a first area A1) over the folding axis AX, a second portion may be spaced apart from the first portion and may be located in an area (e.g., a second area A2) under the folding axis AX. The first portion and the second portion of the second metal layer 90 may be spaced apart from each other with the folding axis AX therebetween.

Figure 4:
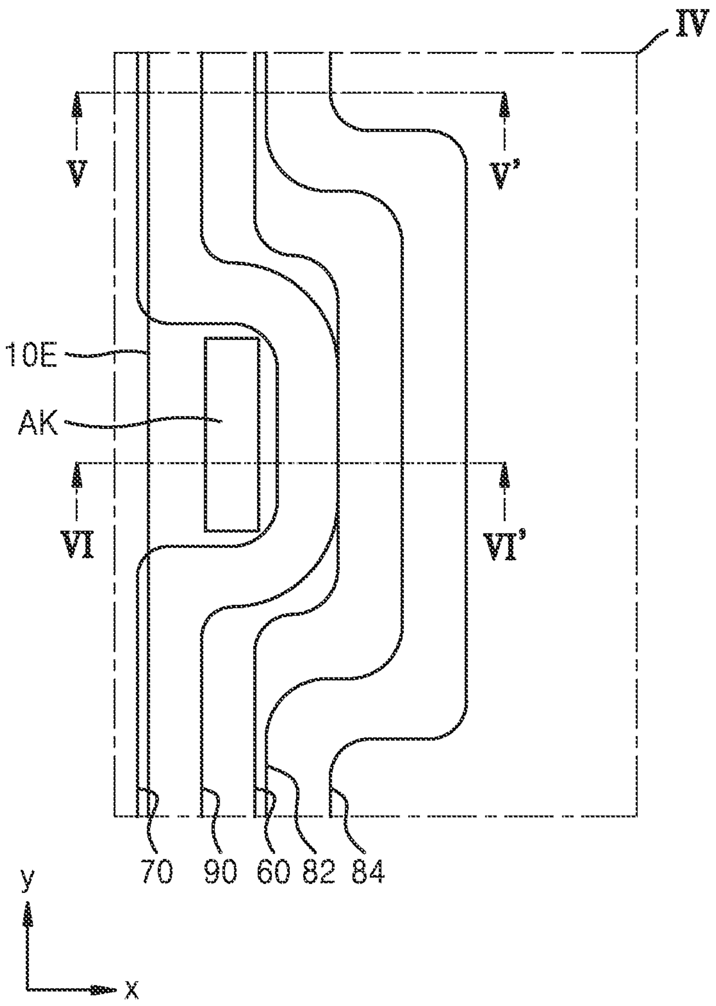
FIG. 4 is a plan view illustrating a part of a display apparatus, corresponding to a portion IV of FIG. 2, according to some embodiments.
Figure 5:
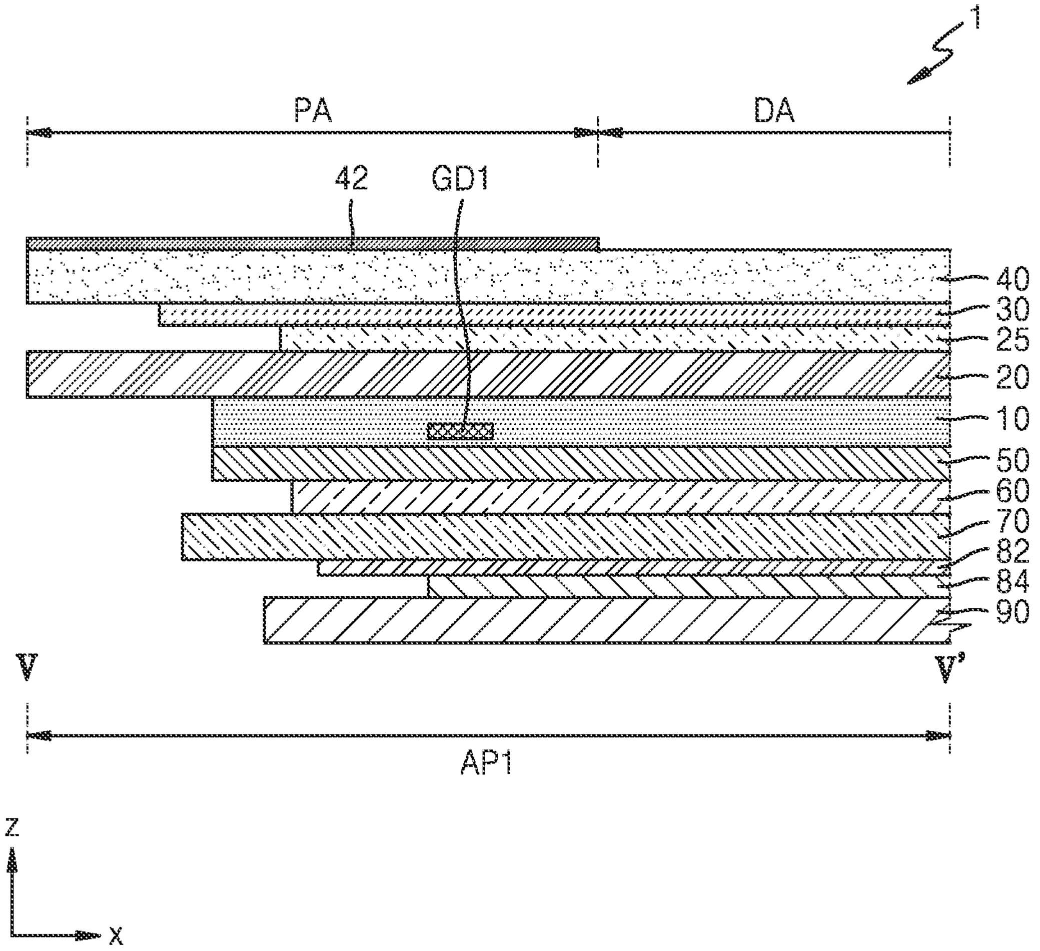
FIG. 5 is a cross-sectional view taken along the line V-V' of FIG. 4.
Figure 6:
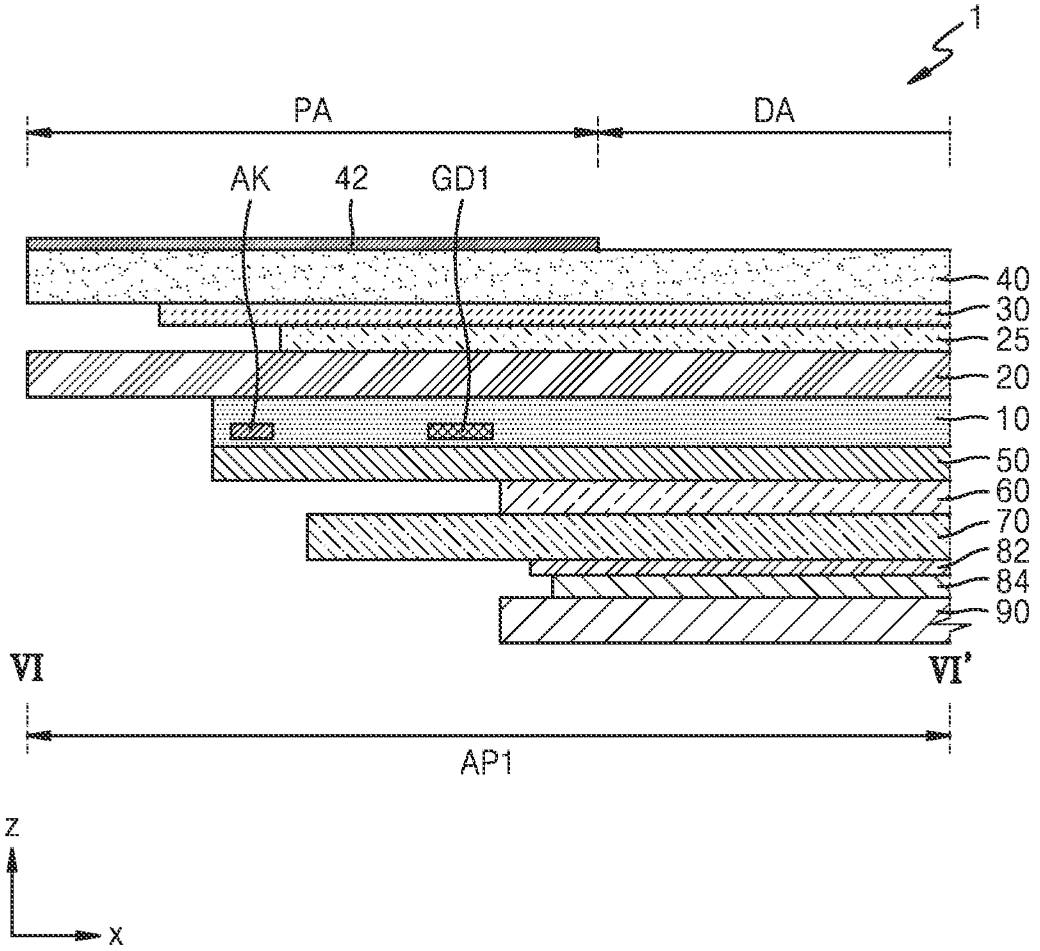
FIG. 6 is a cross-sectional view taken along the line VI-VI' of FIG. 4.

FIG. 4 is a plan view illustrating a part of a display apparatus, corresponding to a portion IV of FIG. 2, according to some embodiments. FIG. 5 is a cross-sectional view taken along the line V-V' of FIG. 4. FIG. 6 is a cross-sectional view taken along the line VI-VI' of FIG. 4.

Referring to FIGS. 5 and 6, the display apparatus 1 may include the display panel 10 as described with reference to FIG. 3. The anti-reflection layer 20, the cover window 30, and the protective layer 40 may be located on a front surface of the display panel 10, and the protective layer 50, the barrier layer 60, the first metal layer 70, the resin layer 82, the second adhesive layer 84, and the second metal layer 80 may be located on a rear surface of the display panel 10.

The anti-reflection layer 20, the cover window 30, the protective layer 40, the protective layer 50, the barrier layer 60, the first metal layer 70, the resin layer 82, the second adhesive layer 84, and the second metal layer 80 of FIGS. 5 and 6 are the same as those described with reference to FIG. 3. However, FIGS. 5 and 6 are cross-sectional views illustrating the display apparatus 1 corresponding to the first area AP1, and unlike in FIG. 3 that is a cross-sectional view of the display apparatus 1 corresponding to the folding area FA, a part of the first metal layer 70 corresponding to the first area AP1 may not have a hole. Referring to FIGS. 3 and 5, a portion of the first metal layer 70 corresponding to the folding area FA may have a lattice pattern (or a mesh pattern) having holes that are two-dimensionally arranged, and portions of the first metal layer 70 corresponding to the first area A1 (see FIG. 2) and the second area A2 (see FIG. 2) may not have a hole and may be metal portions having a relatively constant thickness.

A portion of each of layers included in the display apparatus 1 corresponding to the alignment key AK may have an open shape as shown in FIG. 4. For example, referring to FIGS. 4 and 5, each of the barrier layer 60, the first metal layer 70, the resin layer 82, the second adhesive layer 84, and/or the second metal layer 80 may include a notch-type opening partially surrounding the alignment key AK. Each of the barrier layer 60, the first metal layer 70, the resin layer 82, the second adhesive layer 84, and/or the second metal layer 80 each including a notch-type opening may be located on the rear surface of the display panel 10, and in this case, may be stacked and adhered (or coupled) by using the alignment key AK.

The alignment key AK may be provided on the display panel 10 as shown in FIG. 6. In a plan view as in FIG. 4, an edge 10E of the display panel 10 may be located on a side (e.g., a left side) of the alignment key AK, and an edge of the barrier layer 60 facing the notch-type opening, an edge of the first metal layer 70 facing the notch-type opening, an edge of the resin layer 82 facing the notch-type opening, an edge of the second adhesive layer 84 facing the notch-type opening, and/or an edge of the second metal layer 90 facing the notch-type opening may be located on the other side (e.g., a right side of FIG. 4) of the alignment key AK.

According to some embodiments, referring to FIGS. 4 and 6, the edge of the first metal layer 70 facing the notch-type opening (or the alignment key AK) may be relatively close to the alignment key AK. The edge of the second metal layer 90 facing the alignment key AK and the edge of the barrier layer 60 facing the alignment key AK may be located at substantially the same position, and may be closer to the display area DA than the edge of the first metal layer 70 facing the alignment key AK.

The edge of the resin layer 82 facing the alignment key AK may be closer to the display area DA than the edge of the second metal layer 90 facing the alignment key AK and/or the edge of the barrier layer 60 facing the alignment key AK, and the edge of the second adhesive layer 84 facing the alignment key AK may be closer to the display area DA than the edge of the resin layer 82 facing the alignment key AK.

Referring to FIGS. 3, 5, and 6, the display panel 10 may include the first gate driver circuit GD1 located in the peripheral area PA. The first gate driver circuit GD1 may apply a signal to a transistor (hereinafter, referred to as a compensation transistor) electrically connected to a driving transistor for driving a light-emitting diode included in the display panel 10. The compensation transistor may electrically connect (e.g., diode-connect) a gate and a drain of the driving transistor.

The first gate driver circuit GD1 may be covered or may not be covered by layer(s) located on the rear surface of the display panel 10 according to a position. For example, as shown in FIG. 3, a part of the first gate driver circuit GD1 located in the folding area FA may overlap at least one hole of the first metal layer 70. For example, as shown in FIG. 6, a part of the first gate driver circuit GD1 located in the first area A1 (or the second area) may not overlap the barrier layer 60, the resin layer 82, the second adhesive layer 84, and the second metal layer 90.

Figure 7:
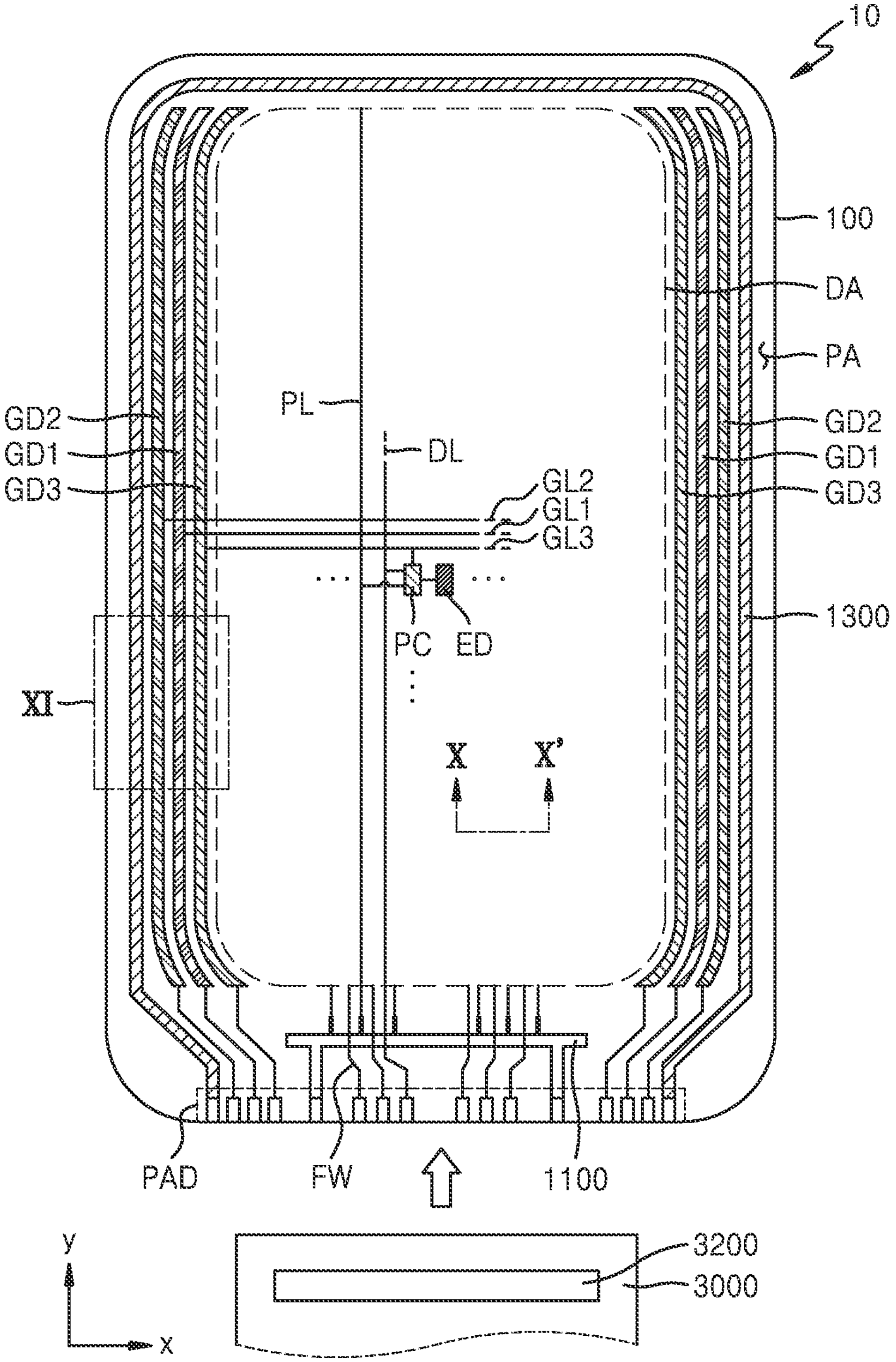
FIG. 7 is a plan view schematically illustrating a display panel, according to some embodiments.

FIG. 7 is a plan view schematically illustrating a display panel, according to some embodiments.

Referring to FIG. 7, various elements constituting the display panel 10 may be located on a substrate 100, and a shape of the display panel 10 is substantially the same as that of the substrate 100. For example, when the display panel 10 includes the display area DA and the peripheral area PA, it may mean that the substrate 100 includes the display area DA and the peripheral area PA. The display area DA may be covered with a sealing member to be protected from external air or moisture.

Sub-pixels may be located in the display area DA of the substrate 100. Each of the sub-pixels may display an image by using light emitted by a light-emitting diode ED. Each light-emitting diode ED may emit, for example, red light, green light, or blue light.

The light-emitting diode ED may be electrically connected to a sub-pixel circuit PC, and each sub-pixel circuit PC may include transistors and a storage capacitor. The sub-pixel circuits PC may be respectively electrically connected to driver circuits located in the peripheral area PA. The driver circuits located in the peripheral area PA may include a first gate driver circuit GD1, a second gate driver circuit GD2, and a third gate driver circuit GD3.

The first gate driver circuit GD1 may apply a first gate signal to each sub-pixel circuit PC through a first gate line GL1, the second gate driver circuit GD2 may apply a second gate signal to each sub-pixel circuit PC through a second gate line GL2, and the third gate driver circuit GD3 may apply a third gate signal to each sub-pixel circuit PC through a third gate line GL3.

The first gate driver circuit GD1, the second gate driver circuit GD2, and the third gate driver circuit GD3 may be located on at least a side of the display area DA. In this regard, in FIG. 7, the first gate driver circuit GD1, the second gate driver circuit GD2, and the third gate driver circuit GD3 are located on a left side and a right side of the display area DA.

According to some embodiments, the first gate driver circuit GD1 may be located between the second gate driver circuit GD2 and the third gate driver circuit GD3. The second gate driver circuit GD2 may be located closer to an edge of the substrate 100 than the first gate driver circuit GD1, and the third gate driver circuit GD3 may be located closer to the display area DA than the first gate driver circuit GD1.

A terminal unit PAD may be located on a side of the substrate 100. The terminal unit PAD is exposed without being covered by an insulating layer, and is connected to a display circuit board 3000. A display driving circuit 3200 may be located on the display circuit board 3000.

The display driving circuit 3200 may generate control signals respectively transmitted to the first gate driver ci9rcuit GD1, the second gate driver circuit GD2, and the third gate driver circuit GD3. The display driving circuit 3200 may generate a data signal, and the generated data signal may be transmitted to the sub-pixel circuit PC through a fan-out wiring FW and a data line DL connected to the fan-out wiring FW. Although the display driving circuit 3200 includes a data driver circuit that applies a data signal in FIG. 7, according to some embodiments, the data driver circuit may be located on the substrate 100.

A driving voltage supply line 1100 may supply a driving voltage to the sub-pixel circuit PC, and a common voltage supply line 1300 may supply a common voltage to a second electrode (e.g., a cathode) of the light-emitting diode ED. For example, the driving voltage may be applied to the sub-pixel circuit PC through a driving voltage line PL connected to the driving voltage supply line 1100, and the common voltage may be applied to the second electrode (e.g., the cathode) of the light-emitting diode ED connected to the common voltage supply line 1300.

Figure 8A:
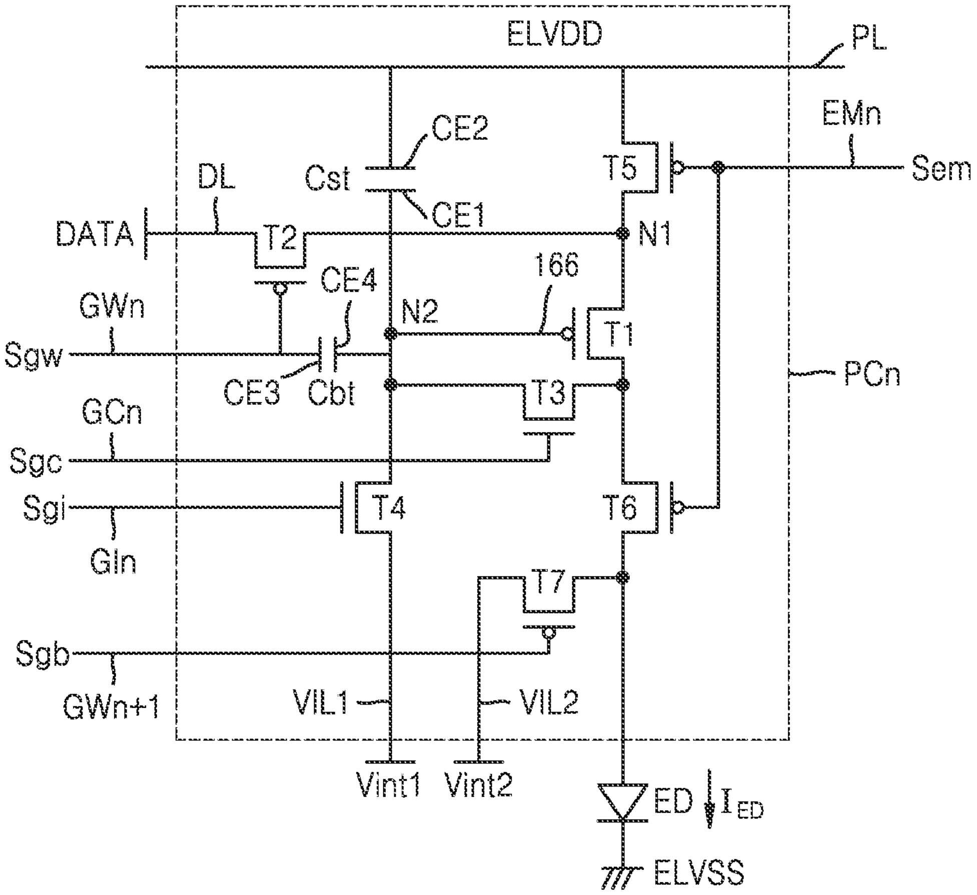
FIGS. 8A and 8B are equivalent circuit diagrams schematically illustrating a light-emitting diode and a sub-pixel circuit electrically connected to the light-emitting diode, according to some embodiments.
Figure 8B:
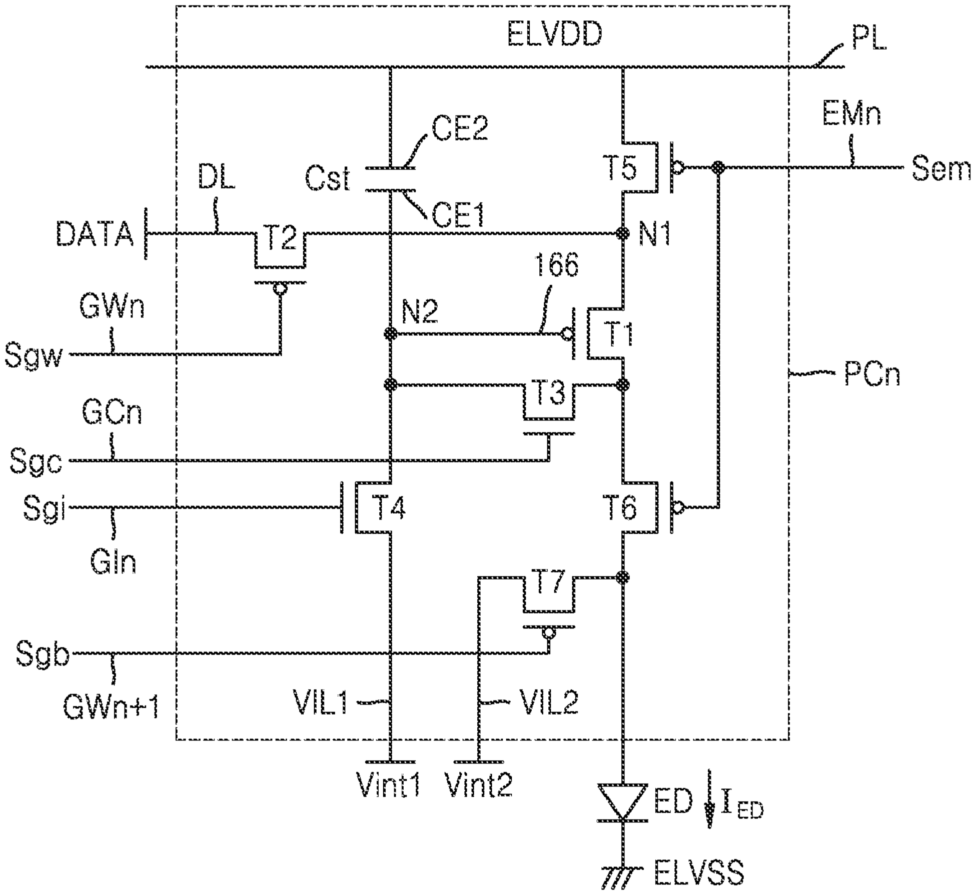

FIGS. 8A and 8B are equivalent circuit diagrams schematically illustrating a light-emitting diode and a sub-pixel circuit electrically connected to the light-emitting diode, according to some embodiments. The sub-pixel circuits PC described with reference to FIG. 7 may be located in the display area DA (see FIG. 7), and may be arranged in rows and columns. FIGS. 8A and 8B illustrate a sub-pixel circuit PCn arranged in an $n^{th}$ row (n is a natural number) among the sub-pixel circuits located in the display area DA of FIG. 7. Although the sub-pixel circuit PCn arranged in the $n^{th}$ row (n is a natural number) is described in FIGS. 8A and 8B, each sub-pixel circuit PC of FIG. 7 may have the same configuration as that described with reference to FIG. 8A or 8B.

Referring to FIGS. 8A and 8B, the light-emitting diode ED may be electrically connected to the sub-pixel circuit PCn including transistors and a storage capacitor.

The light-emitting diode ED may be an organic light-emitting diode including an organic material as a light-emitting material. According to some embodiments, the light-emitting diode ED may be an inorganic light-emitting diode including an inorganic material. The inorganic light-emitting diode may include a PN junction diode including inorganic semiconductor-based materials. When a voltage is applied to a PN junction diode in a forward direction, holes and electrons may be injected, and energy generated by recombination of the holes and electrons may be converted into light energy to emit light of a certain color. In some embodiments, the light-emitting diode ED may include a quantum-dot light-emitting diode. As described above, an emission layer of the light-emitting diode ED may include an organic material, may include an inorganic material, may include quantum dots, may include an organic material and quantum dots, or may include an inorganic material and quantum dots. For convenience of explanation, the following will be described assuming that the light-emitting diode ED includes an organic light-emitting diode.

The light-emitting diode ED may include a first electrode (e.g., an anode) and a second electrode (e.g., a cathode) facing each other, and an emission layer between the first electrode and the second electrode. The second electrode may receive a common voltage ELVSS. The emission layer of the light-emitting diode ED may receive driving current $I_{ED}$ from a first transistor T1 to emit light.

The sub-pixel circuit PCn may include the first transistor T1, a second transistor T2, a third transistor T3, a fourth transistor T4, a fifth transistor T5, a sixth transistor T6, and a seventh transistor T7.

The sub-pixel circuit PCn is connected to signal lines, first and second initialization voltage lines VIL1 and VIL2, and the driving voltage line PL. The signal lines may include the data line DL, an $n^{th}$ scan line GWn, an $n^{th}$ compensation gate line GCn, an $n^{th}$ initialization gate line Gln, an $(n+1)^{th}$ scan line GWn+1, and an $n^{th}$ emission control line EMn. According to some embodiments, at least one of the signal lines, the first and second initialization voltage lines VIL1 and VIL2, and/or the driving voltage line PL may be shared by neighboring sub-pixel circuits.

The driving voltage line PL may transmit a driving voltage ELVDD to the first transistor T1. The first initialization voltage line VIL1 may transmit a first initialization voltage Vint1 for initializing the first transistor T1 to the sub-pixel circuit PCn. The second initialization voltage line VIL2 may transmit a second initialization voltage Vint2 for initializing the light-emitting diode ED to the sub-pixel circuit PCn.

The first transistor T1 is connected to the driving voltage line PL via the fifth transistor T5, and is electrically connected to the light-emitting diode ED via the sixth transistor T6. The first transistor T1 functions as a driving transistor, and receives a data signal DATA and supplies the driving current $I_{ED}$ to the light-emitting diode ED according to a switching operation of the second transistor T2.

The second transistor T2 that is a switching transistor is connected to the $n^{th}$ scan line GWn and the data line DL, and is connected to the driving voltage line PL via the fifth transistor T5. The second transistor T2 is turned on according to an $n^{th}$ scan signal Sgw received through the $n^{th}$ scan line GWn, and performs a switching operation of transmitting the data signal DATA received through the data line DL to a first node N1.

The third transistor T3 that is a compensation transistor may be connected to the $n^{th}$ compensation gate line GCn. The third transistor T3 may be electrically connected to a gate electrode of the first transistor T1 through a node connection line 166. The third transistor T3 is turned on according to a compensation gate signal Sgc received through the $n^{th}$ compensation gate line GCn, to diode-connect the first transistor T1. For example, the third transistor T3 may electrically connect a drain electrode and the gate electrode of the first transistor T1 so that the first transistor T1 has a diode-connection structure.

The fourth transistor T4 that is a first initialization transistor is connected to the $n^{th}$ initialization gate line Gln and the first initialization voltage line VIL1, and is turned on according to a gate initialization signal Sgi received through the $n^{th}$ initialization gate line Gln, to transmit the first initialization voltage Vint1 to the gate electrode of the first transistor T1 and initialize a voltage of the gate electrode of the first transistor T1.

The fifth transistor T5 may be an operation control transistor, and the sixth transistor T6 may be an emission control transistor. The fifth transistor T5 and the sixth transistor T6 are connected to the $n^{th}$ emission control line EMn, and are simultaneously turned on according to an emission control signal Sem received through the $n^{th}$ emission control line EMn, to form a current path through which the driving current $I_{ED}$ flows from the driving voltage line PL to the light-emitting diode ED.

The seventh transistor T7 that is a second initialization transistor may be electrically connected to the $(n+1)^{th}$ scan line GWn+1, the second initialization voltage line VIL2, and the sixth transistor T6. The seventh transistor T7 is turned on according to an $(n+1)^{th}$ scan signal Sgb received through the $(n+1)^{th}$ scan line GWn+1, to transmit the second initialization voltage Vint2 from the second initialization voltage line VIL2 to the light-emitting diode ED and initialize the light-emitting diode ED.

A first capacitor Cst includes a first electrode CE1 and a second electrode CE2. The first electrode CE1 is connected to the gate electrode of the first transistor T1, and the second electrode CE2 is connected to the driving voltage line PL. The first capacitor Cst that is a storage capacitor may maintain a voltage applied to the gate electrode of the first transistor T1 by storing and maintaining a voltage corresponding to a difference between voltages of both ends of the gate electrode of the first transistor T1 and the driving voltage line PL.

In some embodiments, as shown in FIG. 8A, a second capacitor Cbt includes a third electrode CE3 and a fourth electrode CE4. The third electrode CE3 is connected to a gate electrode of the second transistor T2 and the scan line GWn. The fourth electrode CE4 is connected to the gate electrode of the first transistor T1 and the first electrode CE1 of the first capacitor Cst. The second capacitor Cbt is a boosting capacitor, and when the first scan signal Sgw of the $n^{th}$ scan line GWn is a voltage for turning off the second transistor T2, the second capacitor Cbt may reduce a voltage displaying black (black voltage) by increasing a voltage of a second node N2. According to some embodiments, as shown in FIG. 8B, the second capacitor Cbt may be omitted.

Figure 9:
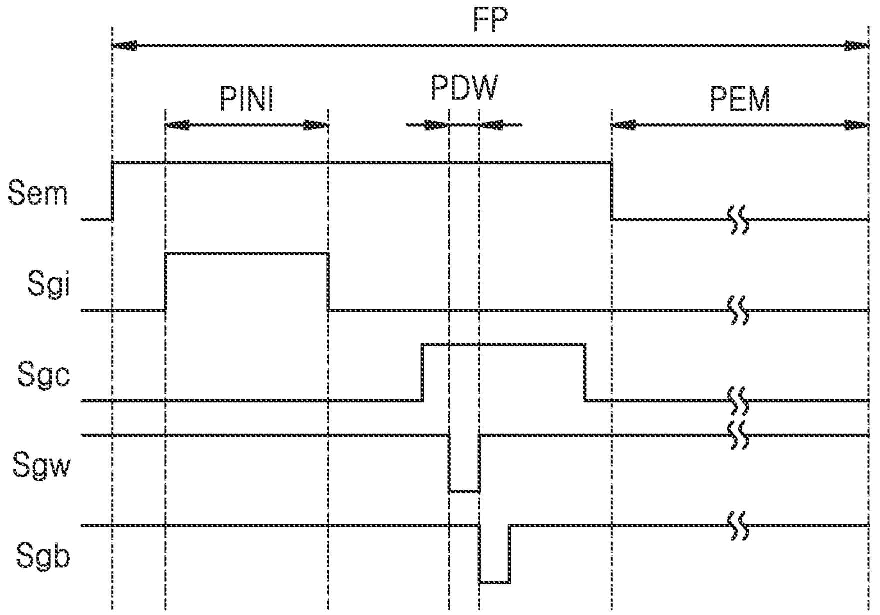
FIG. 9 is a waveform diagram of a signal applied to a sub-pixel circuit of a display panel, according to some embodiments.

FIG. 9 is a waveform diagram of a signal applied to a sub-pixel circuit of a display panel, according to some embodiments. For convenience of explanation, FIG. 9 illustrates a waveform diagram of a signal applied to the sub-pixel circuit of FIG. 8B.

During a period in which the emission control signal Sem has an off-level (e.g., a high level), the gate initialization signal Sgi, the compensation gate signal Sgc, and the scan signal Sgw may have an on-level.

In an initialization period PINI, the emission control signal Sem, the scan signal Sgw, and the compensation gate signal Sgc may have an off-level, and the gate initialization signal Sgi may have an on-level. The fourth transistor T4 (see FIG. 8B) may be turned on in response to the gate initialization signal Sgi having the on-level. The fourth transistor T4 (see FIG. 8B) may apply the initialization voltage Vint1 to the second node N2 so that the second node N2 is initialized (e.g., the first transistor T1 (see FIG. 8B) and the first capacitor Cst are initialized).

As described with reference to FIG. 8B, the scan signal Sgw may be applied to the second transistor T2 (see FIG. 8B), the compensation gate signal Sgc may be applied to the third transistor T3 (see FIG. 8B), and the gate initialization signal Sgi may be applied to the fourth transistor T4 (see FIG. 8B). The third transistor T3 (see FIG. 8B) and the fourth transistor T4 (see FIG. 8B) may be NMOSFETs, and the second transistor T2 (see FIG. 8B) may be a PMOSFET. Accordingly, an on-level of the gate initialization signal Sgi may correspond to a case where the gate initialization signal Sgi has a high level, an on-level of the compensation gate signal Sgc may correspond to a case where the compensation gate signal Sgc has a high level, and an on-level of the scan signal Sgw may correspond to a case where the scan signal Sgw has a low level.

In a compensation and data writing period PDW, the emission control signal Sem and the gate initialization signal Sgi may have an off-level, and the scan signal Ggw and the compensation gate signal Sgc may have an on-level. The second and third transistors T2 and T3 may be turned on in response to the scan signal Sgw and the compensation gate signal Sgc having the on-level. The second transistor T2 may transmit the data voltage DATA of the data line DL to a source (source electrode) of the first transistor T1. Also, the third transistor T3 may diode-connect the first transistor T1, and may store a voltage VDATA-VTH obtained by subtracting a threshold voltage VTH of the first transistor T1 from the data voltage DATA through the first transistor T1 that is diode-connected to the second electrode of the first capacitor Cst. An electric charge corresponding to a difference between voltages of the first electrode and the second electrode may be stored in the first capacitor Cst.

The seventh transistor T7 is turned on by receiving the scan signal Sgb having an on-level through the scan line GWn+1 (see FIG. 8B). Part of driving current may be discharged as bypass current through the seventh transistor T7 by the seventh transistor T7.

In an emission period PEM, the gate initialization signal Sgi, the scan signal Sgw, and the compensation gate signal Sgc may have an off-level, and the emission control signal Sem may have an on-level. The fifth and the sixth transistors T5 and T6 may be turned on in response to the emission control signal Sem having the on-level. The first transistor T1 may generate the driving current $I_{ED}$ (see FIG. 8B) based on the voltage VDATA-VTH of the second node N2, and the light-emitting diode ED may emit light based on the driving current $I_{ED}$ generated by the first transistor T1.

Figure 10:
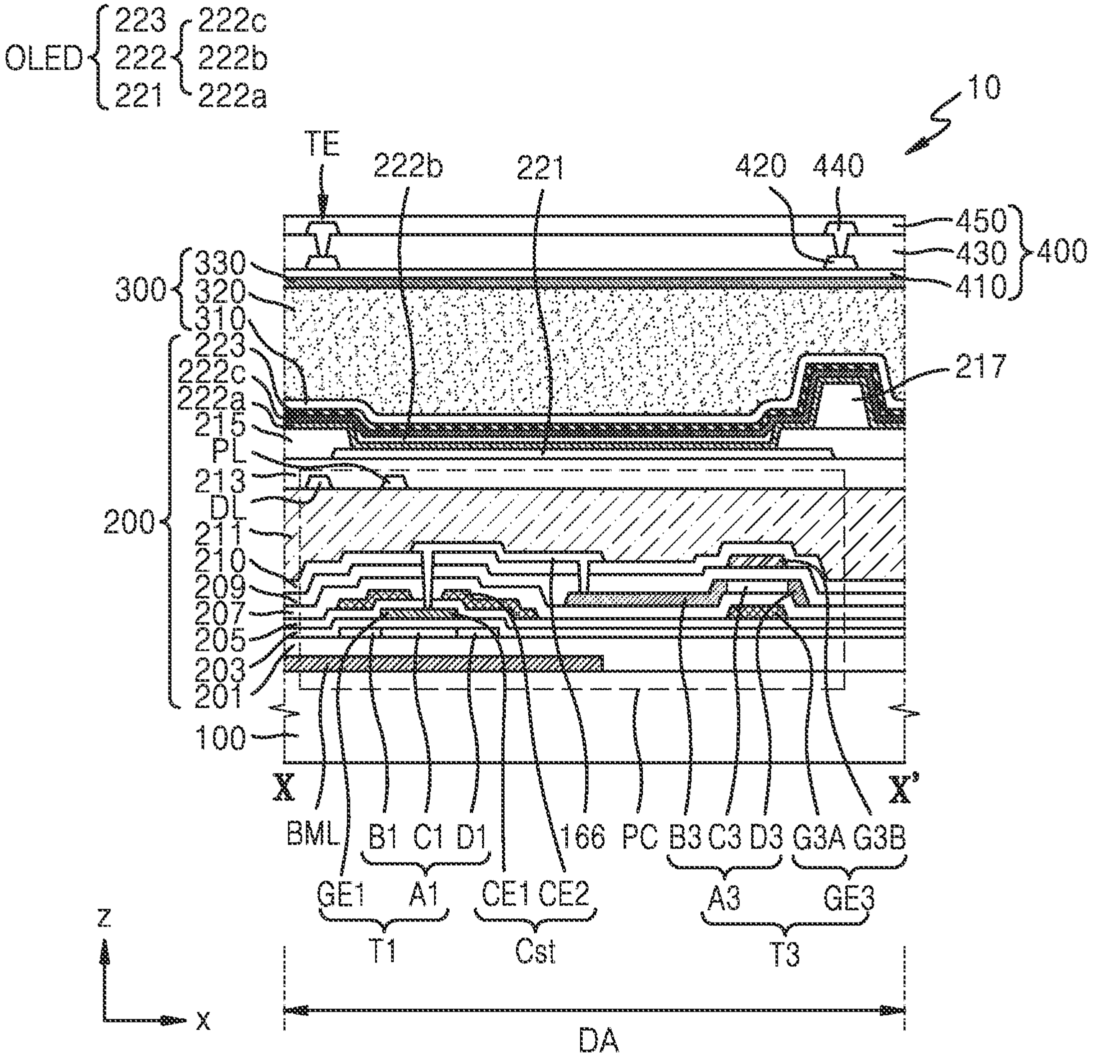
FIG. 10 is a cross-sectional view illustrating a display panel, taken along the line X-X' of FIG. 7, according to some embodiments.

FIG. 10 is a cross-sectional view illustrating a display panel, taken along the line X-X' of FIG. 7, according to some embodiments.

The display panel 10 may include the sub-pixel circuit PC and a light-emitting diode, for example, an organic light-emitting diode OLED, located in the display area DA.

The substrate 100 may include a glass material or a polymer resin. According to some embodiments, the substrate 100 may have a structure in which a base layer including a polymer resin and a barrier layer including an inorganic insulating material such as silicon oxide or silicon nitride are alternately stacked. Examples of the polymer resin may include polyethersulfone, polyarylate, polyether imide, polyethylene naphthalate, polyethylene terephthalate, polyphenylene sulfide, polyimide, polycarbonate, cellulose triacetate, and cellulose acetate propionate.

The sub-pixel circuit PC may be formed on the substrate 100, and a light-emitting diode, for example, an organic light-emitting diode OLED, may be formed on the sub-pixel circuit PC. Before the sub-pixel circuit PC is formed on the substrate 100, a buffer layer 201 may be formed on the substrate 100 to prevent or reduce penetration of impurities into the sub-pixel circuit PC. The buffer layer 201 include an inorganic insulating material such as silicon nitride, silicon oxynitride, or silicon oxide, and may have a single or multi-layer structure including the above inorganic insulating material.

The sub-pixel circuit PC may include a plurality of transistors and at least one capacitor as described with reference to FIGS. 8A and 8B. In this case, FIG. 10 illustrates the first transistor T1, the third transistor T3, and the first capacitor Cst.

The first transistor T1 may include a semiconductor layer (hereinafter, referred to as a first semiconductor layer A1) on the buffer layer 201 and a gate electrode (hereinafter, referred to as a first gate electrode GE1) overlapping a channel region C1 of the first semiconductor layer A1. The first semiconductor layer A1 may include a silicon-based semiconductor material, for example, polysilicon. The first semiconductor layer A1 may include the channel region C1, and a first region B1 and a second region D1 located on both sides of the channel region C1. The first region B1 and the second region D1 are regions having a higher impurity concentration than the channel region C1, and one of the first region B1 and the second region D1 may correspond to a source region and the other may correspond to a drain region.

A first gate insulating layer 203 may be located between the first semiconductor layer A1 and the first gate electrode GE1. The first gate insulating layer 203 may include an inorganic insulating material such as silicon oxide, silicon nitride, or silicon oxynitride, and may have a single or multi-layer structure including the above inorganic insulating material.

The first gate electrode GE1 may include a conductive material including molybdenum (Mo), aluminum (Al), copper (Cu), or titanium (Ti), and may have a single or multi-layer structure including the above material.

A bottom metal layer BML may be located under the first transistor T1. The bottom metal layer BML may be located between the substrate 100 and the first transistor T1. The bottom metal layer BML may include at least one material selected from among aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu). In some embodiments, the bottom metal layer BML may have a single-layer structure including molybdenum, may have a two-layer structure in which a molybdenum layer and a titanium layer are stacked, or may have a three-layer structure in which a titanium layer, an aluminum layer, and a titanium layer are stacked. The bottom metal layer BML may prevent or reduce the occurrence of unintended polarization around the first semiconductor layer A1 of the first transistor T1 and affecting an operation of the first transistor T1.

The first capacitor Cst may include the first electrode CE1 and the second electrode CE2 overlapping each other. The first electrode CE1 of the first capacitor Cst may include the first gate electrode GE1. In other words, the first gate electrode GE1 may include the first electrode CE1 of the first capacitor Cst. For example, the first gate electrode GE1 and the first electrode CE1 of the first capacitor Cst may be integrally formed with each other.

A first interlayer insulating layer 205 may be located between the first electrode CE1 and the second electrode CE2 of the first capacitor Cst. The first interlayer insulating layer 205 may include an inorganic insulating material such as silicon oxide, silicon nitride, or silicon oxynitride, and may have a single or multi-layer structure including the above inorganic insulating material.

The second electrode CE2 of the first capacitor Cst may include a low-resistance conductive material such as molybdenum (Mo), aluminum (Al), copper (Cu), and/or titanium (Ti), and may have a single or multi-layer structure including the above material.

A second interlayer insulating layer 207 may be located on the first capacitor Cst. The second interlayer insulating layer 207 may include an inorganic insulating material such as silicon oxide, silicon nitride, or silicon oxynitride, and may have a single or multi-layer structure including the above inorganic insulating material.

A semiconductor layer (hereinafter, referred to as a third semiconductor layer A3) of the third transistor T3 may be located on the second interlayer insulating layer 207. The third semiconductor layer A3 may include an oxide-based semiconductor material. For example, the third semiconductor layer A3 may be formed of a Zn oxide-based material such as Zn oxide, In—Zn oxide, or Ga—In—Zn oxide. In some embodiments, the third semiconductor layer A3 may be formed of an In—Ga—Zn—O (IGZO), In—Sn—Zn—O (ITZO), or In—Ga—Sn—Zn—O (IGTZO) semiconductor containing a metal such as indium (In), gallium (Ga), or tin (Sn) in ZnO.

The third semiconductor layer A3 may include a channel region C3 and a first region B3 and a second region D3 located on both sides of the channel region C3. Any one of the first region B3 and the second region D3 may be a source region, and the other may be a drain region.

The third transistor T3 may include a gate electrode (hereinafter, referred to as a third gate electrode GE3) overlapping the channel region C3 of the third semiconductor layer A3. The third gate electrode GE3 may have a double gate structure including a lower gate electrode G3A located under the third semiconductor layer A3 and an upper gate electrode G3B located over the channel region C3.

The lower gate electrode G3A may be located on the same layer (e.g., the first interlayer insulating layer 205) as the second electrode CE2 of the first capacitor Cst. The lower gate electrode G3A and the second electrode CE2 of the first capacitor Cst may include the same material.

The upper gate electrode G3B may be located over the third semiconductor layer A3 with a second gate insulating layer 209 therebetween. The second gate insulating layer 209 may include an inorganic insulating material such as silicon oxide, silicon nitride, or silicon oxynitride, and may have a single or multi-layer structure including the above inorganic insulating material.

A third interlayer insulating layer 210 may be located on the upper gate electrode G3B. The third interlayer insulating layer 210 may include an inorganic insulating material such as silicon oxynitride, and may have a single or multi-layer structure including the above inorganic insulating material.

The first transistor T1 and the third transistor T3 may be electrically connected to each other through the node connection line 166. The node connection line 166 may be located on the third interlayer insulating layer 210. One side of the node connection line 166 may be connected to the first gate electrode GE1 of the first transistor T1, and the other side of the node connection line 166 may be connected to the third semiconductor layer A3 of the third transistor T3.

The node connection line 166 may include aluminum (Al), copper (Cu), and/or titanium (Ti), and may have a single or multi-layer structure including the above material. For example, the node connection line 166 may have a three-layer structure including a titanium layer, an aluminum layer, and a titanium layer.

A first organic insulating layer 211 may be located on the node connection line 166. The first organic insulating layer 211 may include an organic insulating material. The organic insulating material may include acryl, benzocyclobutene (BCB), polyimide, or hexamethyldisiloxane (HMDSO).

The data line DL and the driving voltage line PL may be located on the first organic insulating layer 211, and may be covered by a second organic insulating layer 213. Each of the data line DL and the driving voltage line PL may include aluminum (Al), copper (Cu), and/or titanium (Ti), and may have a single or multi-layer structure including the above material. For example, each of the data line DL and the driving voltage line PL may have a three-layer structure including a titanium layer, an aluminum layer, and a titanium layer.

The second organic insulating layer 213 may include an organic insulating material such as acryl, BCB, polyimide, and/or HMDSO. Although the data line DL and the driving voltage line PL are formed on the first organic insulating layer 211 in FIG. 10, embodiments according to the present disclosure are not limited thereto. According to some embodiments, any one of the data line DL and the driving voltage line PL may be located on the same layer (e.g., the third interlayer insulating layer 210) as the node connection line 166.

The light-emitting diode, for example, the organic light-emitting diode OLED, may be located on the second organic insulating layer 213.

A first electrode 221 of the organic light-emitting diode OLED may include a reflective film including silver (Ag), magnesium (Mg), aluminum (Al), platinum (Pt), palladium (Pd), gold (Au), nickel (Ni), neodymium (Nd), iridium (Ir), chromium (Cr), or a compound thereof. According to some embodiments, the first electrode 221 may further include a conductive oxide layer over and/or under the reflective film. The conductive oxide layer may include indium tin oxide (ITO), indium zinc oxide (IZO), zinc oxide (ZnO), indium oxide ($In_2O_3$), indium gallium oxide (IGO), and/or aluminum zinc oxide (AZO). According to some embodiments, the first electrode 221 may have a three-layer structure including an ITO layer, an Ag layer, and an ITO layer.

A bank layer 215 may be located on the first electrode 221. The bank layer 215 may include an opening overlapping the first electrode 221, and may cover an edge of the first electrode 221. The bank layer 215 may include an organic insulating material such as polyimide.

An intermediate layer 222 includes an emission layer **222*b*. The intermediate layer 222 may include a first functional layer 222*a* located under the emission layer 222*b* and/or a second functional layer 222*c* located over the emission layer 222*b*. The emission layer 222*b* may include a high molecular weight organic material or a low molecular weight organic material emitting light of a certain color. The second functional layer 222*c* may include an electron transport layer (ETL) and/or an electron injection layer (EIL). Each of the first functional layer 222*a* and the second functional layer 222*c*** may include an organic material.

The intermediate layer 222 may have a single stack structure including a single emission layer, or a tandem structure that is a multi-stack structure including a plurality of emission layers. When the intermediate layer 222 has a tandem structure, a charge generation layer CGL may be located between a plurality of stacks.

A second electrode 223 may be formed of a conductive material having a low work function. For example, the second electrode 223 may include a (semi)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. Alternatively, the second electrode 223 may further include a layer formed of ITO, IZO, ZnO, or $In_2O_3$ on the (semi)transparent layer including the above material.

The emission layer **222*b* may be located in the display area DA to overlap the first electrode 221 through the opening of the bank layer 215. The first functional layer 222*a*, the second functional layer 222*c*, and the second electrode 223** may entirely cover the display area DA.

The organic light-emitting diode OLED may be covered by an encapsulation layer 300. The encapsulation layer 300 may include at least one organic encapsulation layer and at least one inorganic encapsulation layer. According to some embodiments, in FIG. 10, the encapsulation layer 300 includes first and second inorganic encapsulation layers 310 and 330 and an organic encapsulation layer 320 located between the first and second inorganic encapsulation layers 310 and 330.

Each of the first and second inorganic encapsulation layers 310 and 330 may include at least one inorganic material from among aluminum oxide, titanium oxide, tantalum oxide, hafnium oxide, zinc oxide, silicon oxide, silicon nitride, and silicon oxynitride. Each of the first inorganic encapsulation layer 310 and the second inorganic encapsulation layer 330 may have a single or multi-layer structure including the above material. The organic encapsulation layer 320 may include a polymer-based material. Examples of the polymer-based material may include an acrylic resin, an epoxy resin, polyimide, and polyethylene. According to some embodiments, the organic encapsulation layer 320 may include acrylate.

An input sensing layer 400 may be located on the encapsulation layer 300. The input sensing layer 400 may include touch electrodes TE and at least one touch insulating layer located in the display area DA. In this regard, in FIG. 10, the input sensing layer 400 includes a first touch insulating layer 410 on the second inorganic encapsulation layer 330, a first conductive line 420 on the first touch insulating layer 410, a second touch insulating layer 430 on the first conductive line 420, a second conductive line 440 on the second touch insulating layer 430, and a third touch insulating layer 450 on the second conductive line 440.

Each of the first touch insulating layer 410, the second touch insulating layer 430, and the third touch insulating layer 450 may include an inorganic insulating material and/or an organic insulating material. According to some embodiments, each of the first touch insulating layer 410 and the second touch insulating layer 430 may include an inorganic insulating material such as silicon oxide, silicon nitride, and/or silicon oxynitride, and the third touch insulating layer 450 may include an organic insulating material.

The touch electrode TE of the input sensing layer 400 may have a structure in which the first conductive line 420 and the second conductive line 440 are connected to each other. Alternatively, the touch electrode TE may include any one of the first conductive line 420 and the second conductive line 440, and in this case, the second touch insulating layer 430 may be omitted.

Each of the first conductive line 420 and the second conductive line 440 may include aluminum (Al), copper (Cu), and/or titanium (Ti), and may have a single or multilayer structure including the above material. For example, each of the first conductive line 420 and the second conductive line 440 may have a three-layer structure including a titanium layer, an aluminum layer, and a titanium layer.

Figure 11:
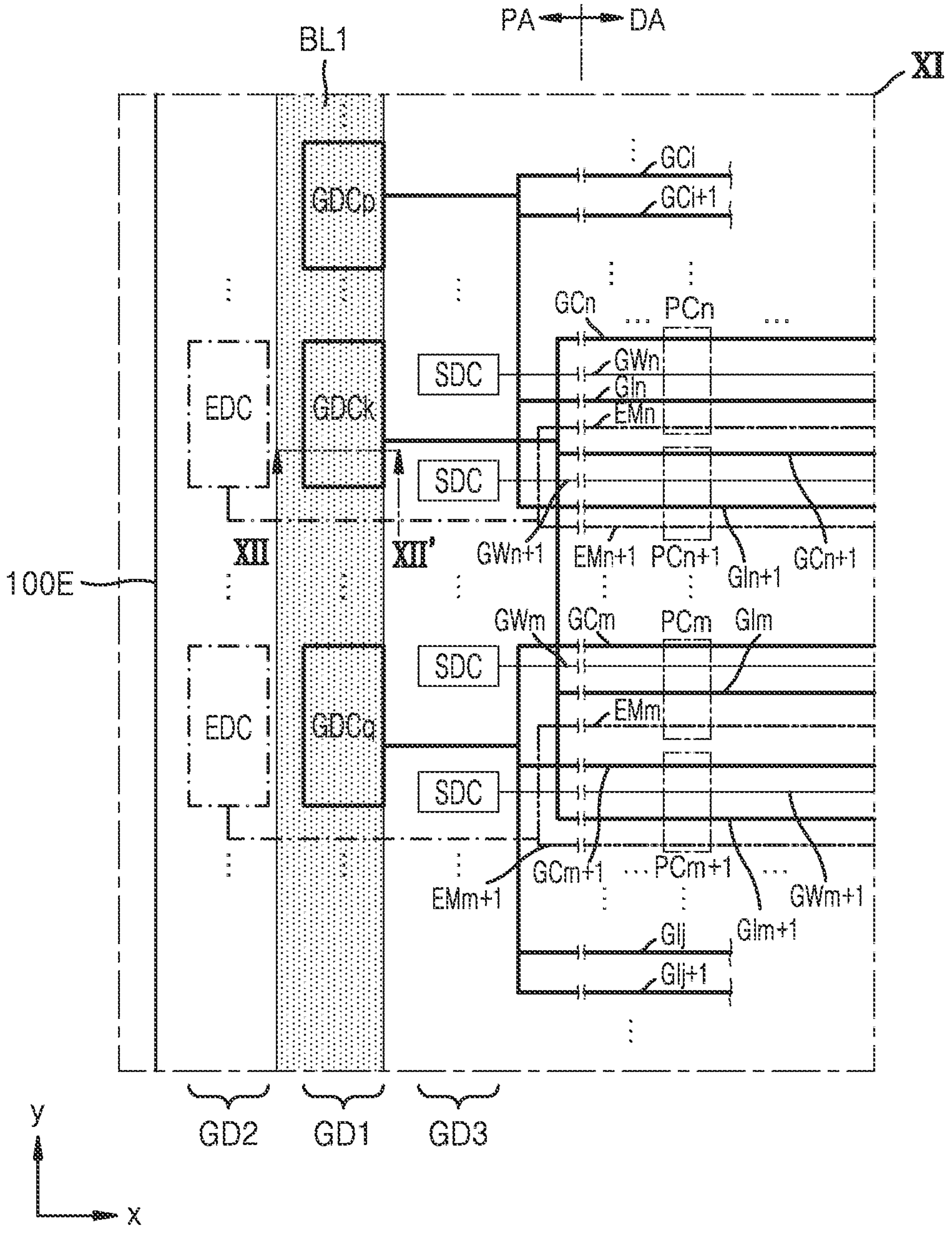
FIG. 11 is an enlarged plan view illustrating a part of a display panel, corresponding to a portion XI of FIG. 7, according to some embodiments.

FIG. 11 is an enlarged plan view illustrating a part of a display panel, corresponding to a portion XI of FIG. 7, according to some embodiments.

Referring to FIG. 11, in the peripheral area PA, the first gate driver circuit GD1, the second gate driver circuit GD2, and the third gate driver circuit GD3 may be located. The second gate driver circuit GD21 and the third gate driver circuit GD3 may be located with the first gate driver circuit GD1 therebetween. For example, the second gate driver circuit GD2 may be located between the first gate driver circuit GD1 and an edge 100E of the substrate, and the third gate driver circuit GD3 may be located between the first gate driver circuit GD1 and the display area DA.

The first gate driver circuit GD1 may include gate driving circuits GDCp, . . . , GDCk, . . . , GDCq arranged in a y-direction, the second gate driver circuit GD2 may include emission control driving circuits EDC arranged in the y-direction, and the third gate driver circuit GD3 may include scan driving circuits SDC arranged in the y-direction.

Sub-pixel circuits PCn located in an $n^{th}$ row from among sub-pixel circuits arranged in the display area DA may be electrically connected to an $n^{th}$ compensation gate line GCn, an $n^{th}$ scan line GWn, an $n^{th}$ initialization gate line Gln, and an $n^{th}$ emission control line EMn. Sub-pixel circuits PCn+1 arranged in an $(n+1)^{th}$ row may be electrically connected to an $(n+1)^{th}$ compensation gate line GCn+1, an $(n+1)^{th}$ scan line GWn+1, an $(n+1)^{th}$ initialization gate line Gln+1, and an $(n+1)^{th}$ emission control line EMn+1. According to some embodiments, the $(n+1)^{th}$ scan line GWn+1 may be shared by a transistor (e.g., the seventh transistor) of the sub-pixel circuit PCn arranged in the $n^{th}$ row.

Sub-pixel circuits PCm arranged in an $m^{th}$ row (m is a natural number, greater than n+1) from among the sub-pixel circuits arranged in the display area DA may be electrically connected to an $m^{th}$ compensation gate line GCm, an $m^{th}$ scan line GWm, an $m^{th}$ initialization gate line Glm, and an $m^{th}$ emission control line EMm. Sub-pixel circuits PCm+1 arranged in an $(m+1)^{th}$ row may be electrically connected to an $(m+1)^{th}$ compensation gate line GCm+1, an $(m+1)^{th}$ scan line GWm+1, an $(m+1)^{th}$ initialization gate line Glm+1, and an $(m+1)^{th}$ emission control line EMm+1. According to some embodiments, the $(m+1)^{th}$ scan line GWm+1 may be shared by a transistor (e.g., the seventh transistor) of the sub-pixel circuit PCm arranged in the $m^{th}$ row.

The $n^{th}$ compensation gate line GCn, the $(n+1)^{th}$ compensation gate line GCn+1, the $m^{th}$ initialization gate line Glm, and the $(m+1)^{th}$ initialization gate line Glm+1 may be electrically connected to a $k^{th}$ (k is a natural number) gate driving circuit GDCk.

The $n^{th}$ initialization gate line Gln and the $(n+1)^{th}$ initialization gate line Gln+1 may be connected to a $p^{th}$ gate driving circuit GDCp (p is a natural number less than k). In addition to the $n^{th}$ initialization gate line Gln and the $(n+1)^{th}$ initialization gate line Gln+1, an $i^{th}$ compensation gate line GCi (i−1 is a natural number less than n−1) and an $(i+1)^{th}$ compensation gate line GCi+1 may also be connected to the $p^{th}$ gate driving circuit GDCp as shown in FIG. 11.

The $m^{th}$ compensation gate line GCm and the $(m+1)^{th}$ compensation gate line GCm+1 may be connected to a $q^{th}$ gate driving circuit GDCq (q is a natural number greater than k). In addition to the $m^{th}$ compensation gate line GCm and the $(m+1)^{th}$ compensation gate line GCm+1, a $j^{th}$ initialization gate line GIj (j is a natural number greater than m+1) and a $(j+1)^{th}$ initialization gate line GIj+1 may also be connected to the $q^{th}$ gate driving circuit GDCq as shown in FIG. 11.

The $n^{th}$ emission control line EMn and the $(n+1)^{th}$ emission control line EMn+1 may be electrically connected to the same emission control driving circuit EDC. The $m^{th}$ emission control line EMm and the $(m+1)^{th}$ emission control line EMm+1 may be electrically connected to the same emission control driving circuit EDC.

In the peripheral area PA, a first lower layer BL1 overlapping the first gate driver circuit GD1 may be located. The first lower layer BL1 may overlap the first gate driver circuit GD1, for example, gate driving circuits arranged along one direction. The first lower layer BL1 may block light incident from a lower side of the display panel 10 (see FIGS. 3, 5, and 6) toward the first gate driver circuit GD1, or incident from a side of the display panel 10 (see FIGS. 3, 5, and 6) toward the first gate driver circuit GD1.

In a comparative example, when external light is incident on the first gate driver circuit GD1 provided in the display panel 10 in various directions (or paths), an unintended bright line may be displayed to a user. When external light is incident on the first gate driver circuit GD1, a falling edge of a compensation signal (e.g., the compensation signal Sgc of FIG. 9) applied through a compensation gate line electrically connected to the first gate driver circuit GD1 may be lengthened, and a voltage may remain on a gate of the first transistor T1 (see FIG. 8B), thereby displaying a bright line. When the falling edge of the compensation signal (e.g., the compensation signal Sgc of FIG. 9) is lengthened, it may mean that a time taken to switch the compensation gate signal Sgc from a high level to a low level is increased. In this case, a voltage may remain on the gate of the first transistor T1 (see FIG. 8B), thereby displaying a bright line.

However, according to some embodiments, because the first lower layer BL1 is located under the first gate driver circuit GD1 electrically connected to the third transistor, the above problem may be prevented, reduced, or minimized. As described above with reference to FIGS. 3, 5, and 6, because the light-shielding portion 42 of the protective layer 40 is located over the first gate driver circuit GD1, external light incident on the first gate driver circuit GD1 of the display panel 10 from the top of the display panel 10 may be blocked.

Figure 12:
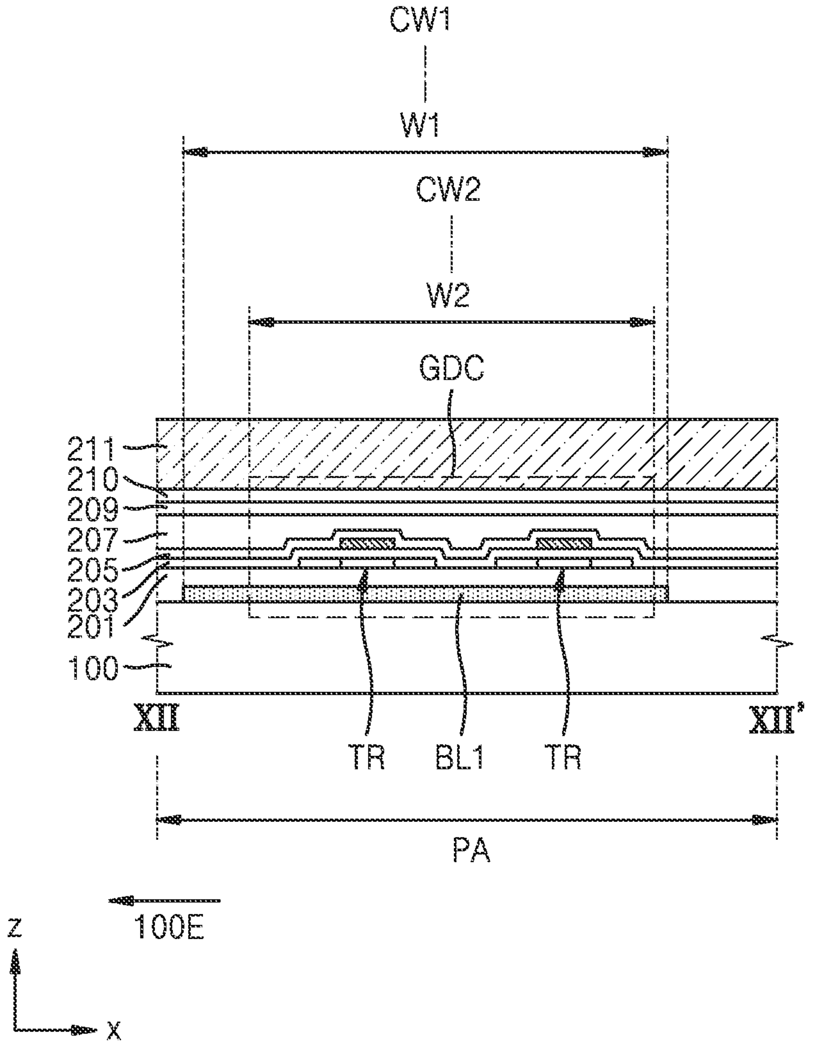
FIG. 12 is a cross-sectional view illustrating a display panel, taken along the line XII-XII' of FIG. 11, according to some embodiments.

FIG. 12 is a cross-sectional view illustrating a display panel, taken along the line XII-XII' of FIG. 11, according to some embodiments.

Referring to FIG. 12, the first lower layer BL1 may be located under a first gate driver circuit. For example, the first lower layer BL1 may be located between the substrate 100 and the first gate driver circuit, for example, a gate driving circuit GDC. Each gate driving circuit GDC may include transistors TR, and the transistors TR may overlap the first lower layer BL1.

A width W1 of the first lower layer BL1 may be greater than a width of the first gate driver circuit. For example, the width W1 of the first lower layer BL1 may be greater than a width W2 of each gate driving circuit GDC. An outer portion of the first lower layer BL1, for example, a portion adjacent to the edge 100E of the substrate, may further extend toward the edge 100E of the substrate 100 than an edge of the first gate driver circuit, for example, an outer edge of the gate driving circuit GDC. In other words, the center CW1 of the width W1 of the first lower layer BL1 may be spaced apart from the center of the width of the first gate driver circuit toward the edge 100E of the substrate. The center of the width of the first gate driver may be substantially the same as the center CW2 of the width W2 of each gate driving circuit GDC of FIG. 12. In other words, the center CW1 of the width W1 of the first lower layer BL1 may be spaced apart from the center CW2 of the width W2 of each gate driving circuit GDC toward the edge 100E of the substrate.

The first lower layer BL1 may include a light-shielding material. According to some embodiments, the first lower layer BL1 may include a metal. In some embodiments, the first lower layer BL1 may include the same material as that of the bottom metal layer BML (see FIG. 10) described with reference to FIG. 10. The first lower layer BL1 and the bottom metal layer BML (see FIG. 10) may be formed in the same process, and thus, the first lower layer BL1 and the bottom metal layer BML (see FIG. 10) may be located on the same layer, for example, the substrate 100.

In some embodiments, the first lower layer BL1 may have a constant voltage level. In some embodiments, the first lower layer BL1 may have the same voltage level as that of the driving voltage line PL described with reference to FIG. 10. To this end, the first lower layer BL1 may be connected to the driving voltage supply line 1100 (see FIG. 7) in the peripheral area.

A structure described with reference to FIGS. 11 and 12 corresponds to a left structure of the display are area DA described with reference to FIG. 7. A right structure of the display area DA is substantially the same as the left structure, and thus, a structure of the first gate driver circuit GD1 located on the right of the display area DA described with reference to FIG. 7 may be substantially the same as that described with reference to FIGS. 11 and 112.

According to some embodiments, display quality may be relatively improved by preventing or reducing defects caused by external light. However, the embodiments are examples, and do not limit the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. A display apparatus comprising:

a substrate comprising a display area and a peripheral area;

a light-emitting diode in the display area on a front surface of the substrate;

a driving transistor in the display area, electrically connected to the light-emitting diode, and comprising a silicon-based semiconductor layer;

a switching transistor in the display area and configured to transmit a data voltage to the driving transistor;

a compensation transistor in the display area, configured to diode-connect the driving transistor, and comprising an oxide-based semiconductor layer;

a gate driving circuit in the peripheral area and electrically connected to the compensation transistor; and a first lower layer in the peripheral area and interposed between the substrate and the gate driving circuit, wherein a width of the first lower layer is greater than a width of the gate driving circuit in a plan view, and wherein a distance between a center of the width of the first lower layer and an edge of the substrate is less than a distance between a center of the width of the gate driving circuit and the edge of the substrate, the edge of the substrate being further from the display area than the center of the width of the first lower layer, and the center of the width of the first lower layer and the center of the width of the gate driving circuit overlap the substrate in the plan view with the first lower layer positioned closer to the edge of the substrate that is further from the display area than the center of the width of the first lower layer relative to the gate driving circuit.

2. The display apparatus of claim 1, wherein the first lower layer comprises a metal.

3. The display apparatus of claim 2, further comprising a bottom metal layer in the display area and comprising a portion overlapping the driving transistor, wherein the first lower layer and the bottom metal layer comprise a same material.

4. The display apparatus of claim 1, wherein a portion of the first lower layer adjacent to an edge of the substrate further extends from the gate driving circuit toward the edge of the substrate.

5. The display apparatus of claim 1, further comprising a first metal layer on a rear surface of the substrate opposite to the front surface of the substrate, and having a mesh structure comprising a plurality of holes.

6. The display apparatus of claim 5, wherein at least one of the plurality of holes of the first metal layer overlaps the gate driving circuit.

7. The display apparatus of claim 6, wherein the substrate comprises a folding area, wherein the plurality of holes of the first metal layer correspond to the folding area of the substrate.

8. The display apparatus of claim 1, further comprising a protective layer on the light-emitting diode and comprising a light-shielding portion corresponding to the peripheral area, wherein the gate driving circuit overlaps the light-shielding portion of the protective layer.

9. The display apparatus of claim 1, wherein the first lower layer has a constant voltage level.

10. An electronic device comprising:

a substrate comprising a display area and a peripheral area;

a plurality of light-emitting diodes on a front surface of the substrate in the display area;

a plurality of sub-pixel circuits respectively electrically connected to the plurality of light-emitting diodes and in the display area, wherein each of the plurality of sub-pixel circuits comprises a driving transistor in the display area and electrically connected to the light-emitting diode, a switching transistor in the display area and configured to transmit a data voltage to the driving transistor, and a compensation transistor in the display area and configured to diode-connect the driving transistor;

a gate driving circuit in the peripheral area and configured to apply a compensation signal to compensation transistors of sub-pixel circuits arranged in an $n^{th}$ row (n is a natural number) through a compensation gate line; and a first lower layer in the peripheral area and interposed between the substrate and the gate driving circuit, wherein a width of the first lower layer is greater than a width of the gate driving circuit in a plan view, and wherein a distance between a center of the width of the first lower layer and an edge of the substrate is less than a distance between a center of the width of the gate driving circuit and the edge of the substrate, the edge of the substrate being further from the display area than the center of the width of the first lower layer, and the center of the width of the first lower layer and the center of the width of the gate driving circuit overlap the substrate in the plan view with the first lower layer positioned closer to the edge of the substrate that is further from the display area than the center of the width of the first lower layer relative to the gate driving circuit.

11. The electronic device of claim 10, wherein each of the plurality of sub-pixel circuits further comprises an initialization transistor electrically connected to a gate electrode of the driving transistor, wherein the gate driving circuit is configured to apply a gate initialization signal to initialization transistors of sub-pixel circuits arranged in an $m^{th}$ row (m is a natural number greater than n+1) through an initialization gate line.

12. The electronic device of claim 10, wherein the first lower layer comprises a metal.

13. The electronic device of claim 12, further comprising a bottom metal layer in the display area and comprising a portion overlapping the driving transistor, wherein the first lower layer and the bottom metal layer comprise a same material.

14. The electronic device of claim 10, wherein a portion of the first lower layer adjacent to an edge of the substrate further extends from the gate driving circuit toward the edge of the substrate.

15. The electronic device of claim 10, further comprising a first metal layer on a rear surface of the substrate opposite to the front surface of the substrate, and having a mesh structure comprising a plurality of holes.

16. The electronic device of claim 15, wherein at least one of the plurality of holes of the first metal layer overlaps the gate driving circuit.

17. The electronic device of claim 15, wherein the substrate comprises a folding area, wherein the plurality of holes of the first metal layer correspond to the folding area of the substrate.

18. The electronic device of claim 10, further comprising a protective layer on the plurality of light-emitting diodes and comprising a light-shielding portion corresponding to the peripheral area, wherein the gate driving circuit overlaps the light-shielding portion of the protective layer.

19. The electronic device of claim 10, wherein the first lower layer has a constant voltage level.

* * * * *